United States Patent [19]

King

[11] Patent Number: 5,738,042

[45] Date of Patent: Apr. 14, 1998

[54] REMOVABLE BIRD CAGE BOWL WITH A LOCKING MOUNT

[76] Inventor: Richard King, 105 West La., Sayville, N.Y. 11782

[21] Appl. No.: 606,572

[22] Filed: Feb. 26, 1996

[51] Int. Cl.⁶ .......................... A01K 39/01; A01K 39/02; A01K 39/04

[52] U.S. Cl. ............................ 119/464; 119/475

[58] Field of Search ....................... 119/61, 74, 464, 119/475

[56] References Cited

U.S. PATENT DOCUMENTS

| | | | |
|---|---|---|---|
| 1,719,769 | 7/1929 | Kaufman | 119/475 |
| 1,879,332 | 9/1932 | Kulp | 119/464 |
| 3,049,093 | 8/1962 | Oliver | 119/475 |
| 4,995,342 | 2/1991 | Hinrichs et al. | 119/464 |
| 5,467,733 | 11/1995 | Messina | 119/464 |
| 5,549,074 | 8/1996 | Hui | 119/464 |

Primary Examiner—John G. Weiss
Assistant Examiner—Ki Yong O
Attorney, Agent, or Firm—Galgano & Burke

[57] ABSTRACT

A removable bird feeding bowl has an upper lip and a circumferential locking surface which is spaced below the upper lip. According to a first embodiment, the locking surface includes two diametrically opposed detents spaced below the upper lip of the bowl. The bowl may be used with an existing supporting ring by snapping the bowl into the ring. According to a second embodiment, the locking surface includes a helical ridge having the form of a screw thread. The bowl may be used with an existing supporting ring by placing the bottom of the bowl into the ring until the helical ridge engages the ring and then twisting the bowl so that the helical ridge makes a screw-like connection with the supporting ring. The upper lip of the bowl stops the bowl from rotating through the ring. According to a third embodiment, a removable bird feeding bowl and support ring assembly is provided. The bowl is substantially the same as the first embodiment and the ring is provided with a pair of diametrically opposed cut-outs which allow the detents on the bowl to pass through the ring. The bowl is placed in the ring by aligning the detents with the cutouts. When the upper lip of bowl contacts the ring, the bowl is rotated so the detents are move out of alignment with the cut-outs and thereby prevent the bowl from being lifted out of the ring.

3 Claims, 3 Drawing Sheets

REMOVABLE BIRD CAGE BOWL WITH A LOCKING MOUNT

BACKGROUND OF THE INVENTION

1. Field of the Invention

The invention relates to a bird cage feeding bowl for containing food or water. More particularly, the invention relates to a bird cage feeding bowl which is removable from a bird cage and which may be lockingly mounted in a bird cage.

2. State of the Art

A known bird cage feeding bowl is shown in prior art FIGS. 1 and 1a. A removable bowl 10 is provided with an upper lip 12. A circular ring 14 is mounted to a convenient part of a bird cage 16, such as the hinged door 18, by means of a bracket 20. The diameter of the upper lip of the bowl 10 is larger than the diameter of the ring 14 so that when the bowl 10 is placed in the ring 14 as seen best in FIG. 1a, the ring 14 supports the bowl 10 by its upper lip 12. This arrangement allows the bowl 10 to be easily removed from the ring 14 and thus the cage 16 so that the bowl 10 may be cleaned, refilled, etc.

Depending on the type of bird being housed in the cage 16, this prior art feeding bowl arrangement may be adequate. However, some birds, particularly large birds such as parrots or macaws, are able to lift the bowl 10 out of the ring 14. When such a bird succeeds in lifting the bowl 10 out of the ring 14, the contents of the bowl 10 are usually spilled onto the floor of the cage 16 or onto objects outside the cage 16. This is a serious disadvantage of the prior art feeding bowl arrangements.

SUMMARY OF THE INVENTION

It is therefore an object of the invention to provide a bird feeding bowl which is removably installed in a bird cage but which cannot be lifted by a bird.

It is also an object of the invention to provide a removable bird feeding bowl which is easy to use and inexpensive to manufacture.

It is another object of the invention to provide a removable bird feeding bowl which can be used with existing feeding bowl support rings.

It is still another object of the invention to provide a removable bird feeding bowl and support ring assembly which is easy to install and remove, but which cannot be disturbed by a bird.

In accord with these objects which will be discussed in detail below, the removable bird feeding bowl of the present invention includes a bowl having an upper lip and a circumferential locking surface which is spaced below the upper lip.

According to a first embodiment of the invention, the locking surface includes two diametrically opposed detents spaced below the upper lip of the bowl. The bowl may be used with an existing supporting ring, provided that the ring and/or the bowl has sufficient elasticity for the bowl to be snapped into the ring. The dimensions and location of the detents are chosen so that when the bowl is snapped into the ring, the ring fits snugly between the detents and the upper lip.

According to a second embodiment of the invention, the locking surface includes a helical ridge having the form of a screw thread. The bowl may be used with an existing supporting ring by placing the bottom of the bowl into the ring until the helical ridge engages the ring and then twisting the bowl so that the helical ridge makes a screw-like connection with the supporting ring. The upper lip of the bowl stops the bowl from rotating through the ring.

According to a third embodiment of the invention, a removable bird feeding bowl and support ring assembly is provided. The bowl is substantially the same as the first embodiment and the ring is provided with a pair of diametrically opposed cut-outs which allow the detents on the bowl to pass through the ring. The bowl is placed in the ring by aligning the detents with the cutouts. When the upper lip of the bowl contacts the ring, the bowl is rotated so the detents are moved out of alignment with the cut-outs and thereby prevent the bowl from being lifted out of the ring. This third embodiment is the presently preferred embodiment and can be made with stainless steel components. The presently preferred embodiment of the ring is provided with a tangential flange plate which is connected by screws to a mounting plate for attaching the ring to a bird cage.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
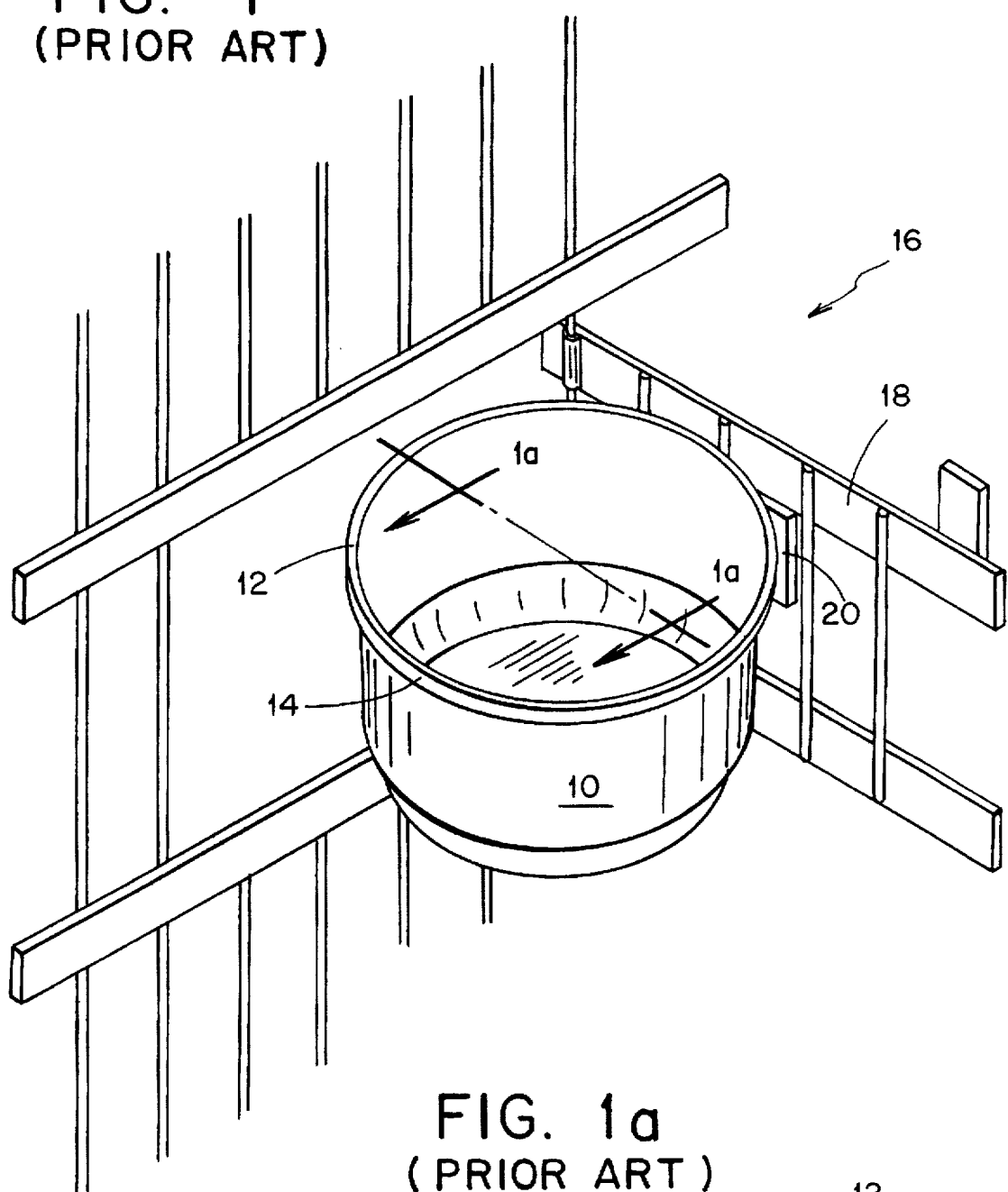
FIG. 1 is a broken perspective view of a prior art bird feeding bowl assembly installed in a bird cage.
Figure 1A:
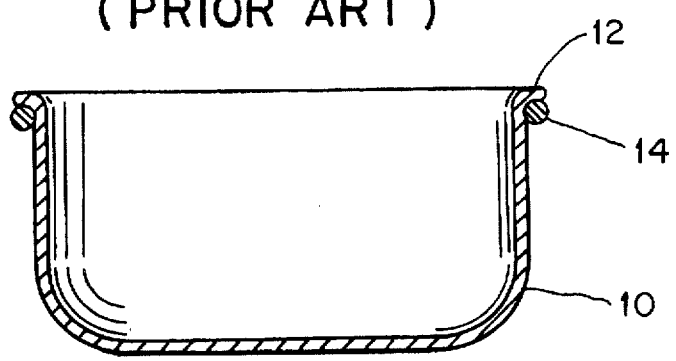
FIG. 1a is a sectional view taken along line 1a—1a in FIG. 1.
Figure 2:
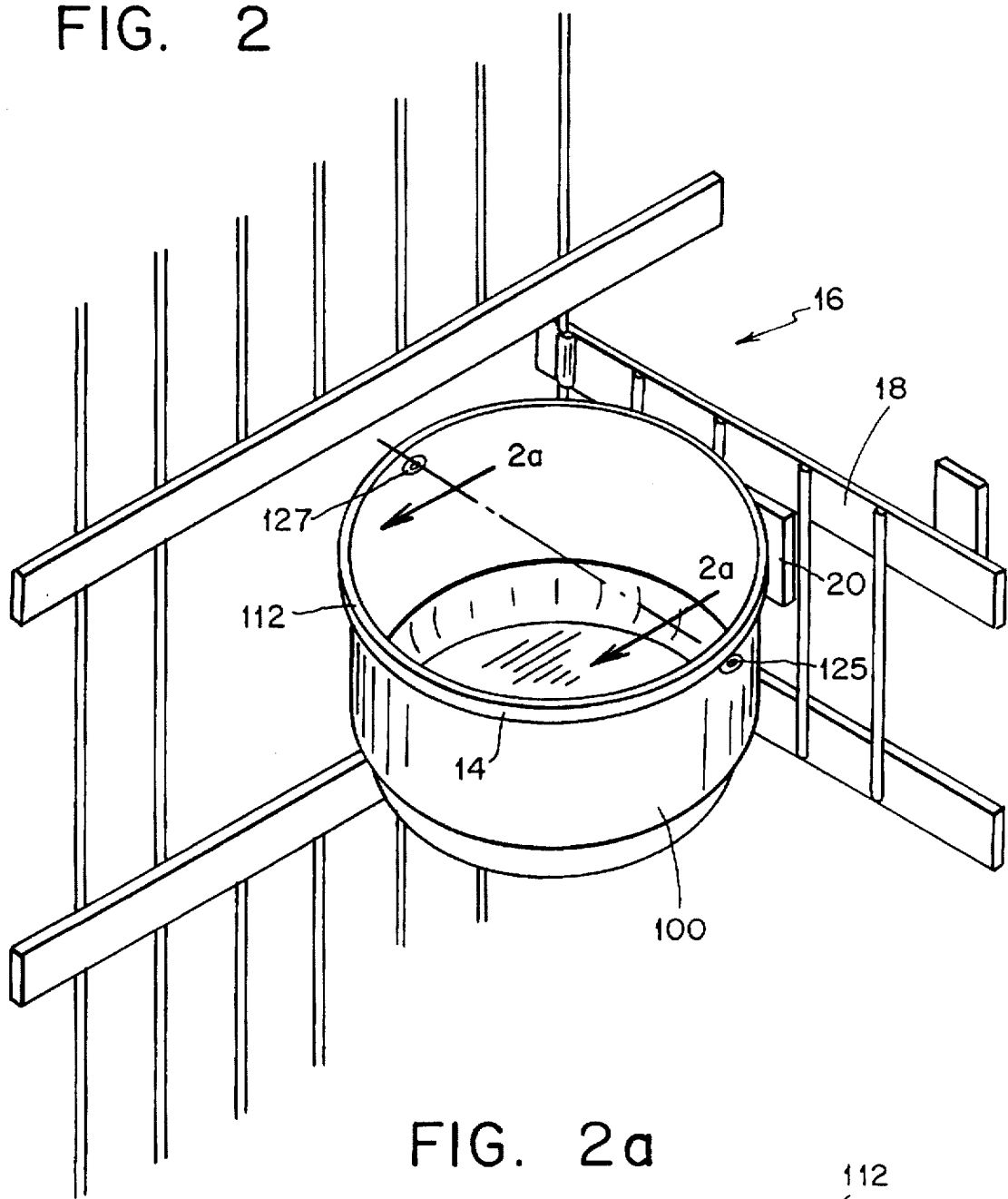
FIG. 2 is a broken perspective view of a first embodiment of a bird feeding bowl according to the invention.
Figure 2A:
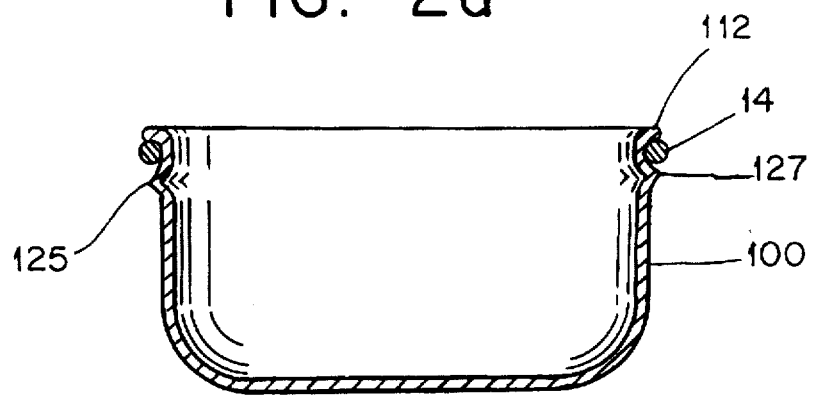
FIG. 2a is a sectional view taken along line 2a—2a in FIG. 2.

Referring now to FIGS. 2 through 2a, a first embodiment of a removable bird feeding bowl 100 of the present invention has an upper lip 112 and two diametrically opposed detents 125, 127 spaced below the upper lip 112 of the bowl 100. The bowl may be used with an existing supporting ring 14, provided that the ring 14 and/or the bowl 100 has sufficient elasticity for the bowl to be snapped into the ring as shown in FIGS. 2 and 2a. The dimensions and location of the detents 125, 127 are chosen so that when the bowl is snapped into the ring 14, the ring 14 fits snugly between the detents 125, 127 and the upper lip 112 of the bowl 100. Moreover, the dimensions and the elasticity of the parts are chosen so that the bowl 100 may be easily removed from the supporting ring 14 by a human, but also provides sufficient resistance to removal by a bird.

Figure 3:
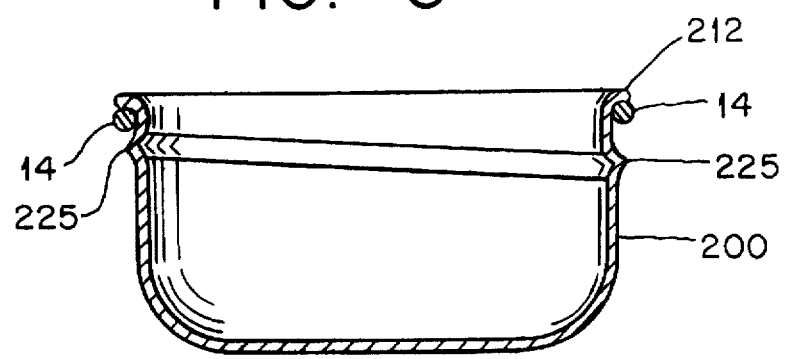
FIG. 3 is a view similar to FIG. 2a of a second embodiment of a bird feeding bowl according to the invention.

Turning now to FIG. 3, a second embodiment of a removable feeding bowl 200 has an upper lip 212 and a helical ridge 225 having the form of a screw thread. The bowl 200 may be used with an existing supporting ring 14 by placing the bottom of the bowl 200 into the ring 14 until the helical ridge 225 engages the ring and then twisting the bowl so that the helical ridge makes a screw-like connection with the supporting ring. The upper lip 212 of the bowl 200 stops the bowl from rotating through the ring.

Figure 4:
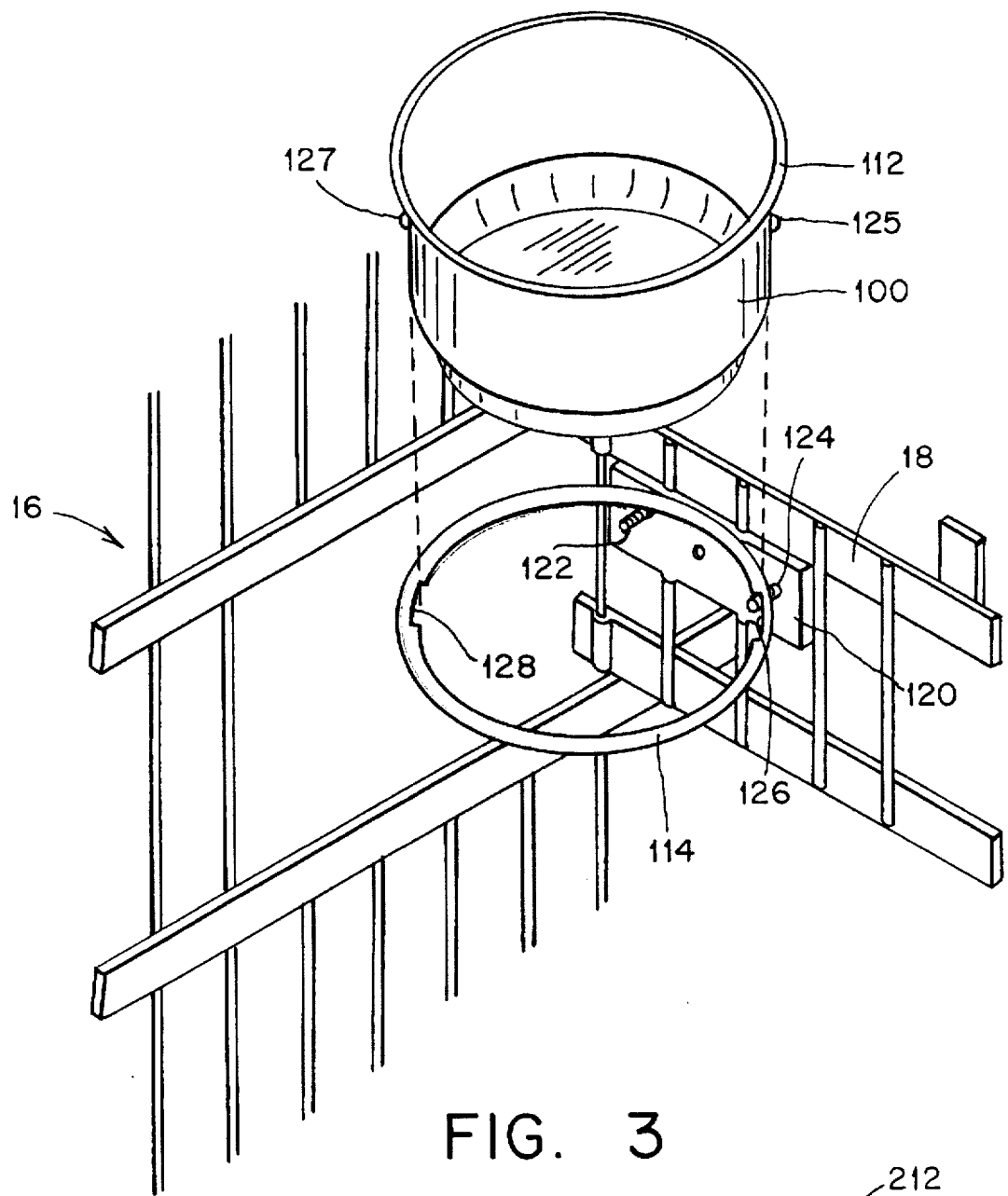
FIG. 4 is a broken perspective exploded view of a presently preferred embodiment of a bird feeding bowl assembly according to the invention.

Referring now to FIG. 4, the first embodiment of the feeding bowl 100 may be advantageously used with a special supporting ring 114. The ring 114 is provided with a pair of diametrically opposed cut-outs 126, 128 which allow the detents 125, 127 on the bowl 100 to pass through the ring 114. The bowl 100 is placed in the ring by aligning the detents 125, 127 with the cutouts 126, 128 as shown in FIG. 4. When the upper lip 112 of bowl 100 contacts the ring 114 (e.g. as shown in FIG. 2a with respect to an existing ring 14), the bowl 100 is rotated so the detents 125, 127 are move out of alignment with the cut-outs 126, 128 and thereby prevent the bowl 100 from being lifted out of the ring 114. This embodiment is the presently preferred embodiment and can be made with stainless steel components. The presently preferred embodiment of the ring 114 is provided with a tangential flange plate 120 which is connected by screws 122, 124 to a mounting plate (not shown) for attaching the ring 114 to a bird cage 16.

There have been described and illustrated herein several embodiments of a bird feeding bowl and a supporting ring for attaching the bowl to a bird cage. While particular embodiments of the invention have been described, it is not intended that the invention be limited thereto, as it is intended that the invention be as broad in scope as the art will allow and that the specification be read likewise. Thus, while particular materials have been disclosed, it will be appreciated that other materials could be utilized. Also, while different supporting rings have been shown, it will be recognized that other types of rings could be used as explained above. Moreover, while particular configurations have been disclosed in reference to the cutouts and the detents, it will be appreciated that other configurations could be used as well. For example, more than two detents and corresponding cutouts could be used. The number of cutouts could be greater than the number of detents. Furthermore, while the preferred supporting ring has been disclosed as having a particular type of mounting flange, it will be understood that different mounting arrangements can achieve the same or similar function as disclosed herein.

It will therefore be appreciated by those skilled in the art that yet other modifications could be made to the provided invention without deviating from its spirit and scope as so claimed.

What is claimed is:

1. A readily removable bird feeding bowl for use with a supporting ring into which said bird feeding bowl may be placed and from which said bird feeding bowl may be removed, said bird feeding bowl comprising:

a bowl comprising a closed bottom, an open top, and an upper supporting lid for engaging an upper surface of the supporting ring; and a generally radially extending helical ridge in the form of a screw thread spaced below said lip for engaging a lower surface of said supporting ring, said helical ridge dimensioned to engage the supporting ring and make a screw-like connection when said bowl is rotated, whereby said bowl is restrained from being readily lifted out of the supporting ring.

2. A readily removable bird feeding bowl and supporting ring assembly comprising:

a bowl comprising a closed bottom, an open top, an upper supporting lip, and at least two generally spaced-apart radially extending detents spaced below said lip; and a supporting ring comprising means for mounting said supporting ring to a bird cage and at least two radial cutouts each of which is dimensioned to receive one of said detents to allow said detents to pass through said supporting ring, so that when said bowl is rotated said detents are moved out of alignment with said cutouts, whereby said bowl is restrained from being readily lifted out of said supporting ring.

3. An assembly according to claim 2, wherein:

said detents are diametrically opposed; and said radial cutouts are diametrically opposed.

\* \* \* \* \*